United States Patent
Magny et al.

(10) Patent No.: US 12,528,904 B2
(45) Date of Patent: Jan. 20, 2026

(54) HEAT-STABILISING AGENT

(71) Applicant: COATEX, Genay (FR)

(72) Inventors: Benoit Magny, Fontaines Saint Martin (FR); Yves Matter, Reyrieux (FR); Denis Ruhlmann, Genay (FR); Jean Marc Suau, Lucenay (FR)

(73) Assignee: COATEX, Genay (FR)

( * ) Notice: Subject to any disclaimer, the term of this patent is extended or adjusted under 35 U.S.C. 154(b) by 804 days.

(21) Appl. No.: 17/785,386

(22) PCT Filed: Dec. 2, 2020

(86) PCT No.: PCT/FR2020/000265
§ 371 (c)(1),
(2) Date: Jun. 14, 2022

(87) PCT Pub. No.: WO2021/123513
PCT Pub. Date: Jun. 24, 2021

(65) Prior Publication Data
US 2023/0025556 A1  Jan. 26, 2023

(30) Foreign Application Priority Data
Dec. 16, 2019 (FR) ..................... 19 14492

(51) Int. Cl.
*C08G 18/48* (2006.01)
*C08G 18/22* (2006.01)
*C08G 18/28* (2006.01)
*C08G 18/32* (2006.01)

(52) U.S. Cl.
CPC ....... *C08G 18/4833* (2013.01); *C08G 18/227* (2013.01); *C08G 18/283* (2013.01); *C08G 18/3221* (2013.01)

(58) Field of Classification Search
None
See application file for complete search history.

(56) References Cited

U.S. PATENT DOCUMENTS

2017/0326060 A1  11/2017  Matsuo et al.
2021/0000720 A1* 1/2021  Sakamoto .............. A61K 8/442

FOREIGN PATENT DOCUMENTS

JP  2016-65151 A  4/2016

OTHER PUBLICATIONS

International Search Report issued Apr. 12, 2021 in PCT/FR2020/000265 filed Dec. 2, 2020, 2 pages.
Anonymous, Retrieved from the Internet [URL: https://m.blog.naver.com/PostView.nhn?blogId=hoonz1ceo&logNo=220043299692&proxyReferer=https:%2F%2Fwww.google.com%2F], XP055726207, Jun. 27, 2014, 15 pages.

* cited by examiner

*Primary Examiner* — Jeffrey D Washville
(74) *Attorney, Agent, or Firm* — Oblon, McClelland, Maier & Neustadt, L.L.P.

(57) ABSTRACT

Polyurethane heat-stabilizing agents may help resist temperature changes and preparations of an aqueous composition which may be resistant to temperature changes due to the use of such an agent (P). The viscosity may be thermally stabilized by such an aqueous composition in a wide temperature range and for many shear gradient values.

17 Claims, No Drawings

HEAT-STABILISING AGENT

CROSS-REFERENCE TO RELATED APPLICATIONS

The present application is the national stage of international application PCT/FR2020/000265, filed on Dec. 2, 2020, and claims the benefit of the filing date of French Appl. No. 1914492, filed on Dec. 16, 2019.

The invention relates to a particular polyurethane heat-stabilizing agent (P) and to the preparation of an aqueous composition which is resistant to temperature changes through the use of said agent (P). It also relates to the thermal stabilization of the viscosity of an aqueous composition in a wide range of temperatures and for numerous shear gradients.

Many technical areas require the use of aqueous compositions. These include, in particular, aqueous hydraulic binder compositions, aqueous bonding agent compositions, aqueous detergent compositions, aqueous cosmetic compositions, aqueous ink compositions, aqueous paper coating compositions, aqueous coating compositions, in particular aqueous varnish compositions or aqueous paint compositions, particularly aqueous decorative paint compositions or aqueous industrial paint compositions.

In addition to their functional properties, these aqueous compositions must have a texture adapted to their use or to their storage. In particular, they must have a viscosity adapted to their use or to their storage.

Moreover, it must be possible to use these aqueous compositions in conditions that can vary greatly. In particular, these aqueous compositions must be used under variable temperature conditions. Indeed, the properties of these aqueous compositions may change or degrade when the temperature changes, both for temperature increases and temperature decreases.

In particular, the viscosity of these aqueous compositions may change or degrade when the temperature changes. The functional properties of these aqueous compositions may therefore be altered if their viscosity changes or degrades when the temperature changes. Such changes or degradations are particularly detrimental or damaging to aqueous hydraulic binder compositions, to aqueous bonding agent compositions, to aqueous detergent compositions, to aqueous ink compositions, to aqueous paper coating compositions, to aqueous cosmetic compositions, to aqueous coating compositions, in particular to aqueous varnish compositions or to aqueous paint compositions.

Document JP 2016 065151 discloses a composition for preparing a thermo-setting polyurethane elastomer. Document US 2017 0326060 describes a cosmetic composition in the form of an oil-in-water emulsion thickened with a hydrophobically modified urethane polyether.

There is therefore a need to be able to have aqueous compositions that do not have such disadvantages or aqueous compositions that do not lead to such problems.

In particular, it is particularly useful to be able to have aqueous coating compositions, in particular aqueous varnish compositions or aqueous paint compositions, with thermally stable viscosity. Such aqueous compositions with little or no change in viscosity when the temperature at the time of their use is above 5° C. or when this temperature is below 50° C., are particularly desirable. These properties are also sought for intermediate temperature ranges that correspond to frequently-encountered conditions of use, for example from 5° C. to 15° C., from 15° C. to 35° C. or from 30° C. to 50° C.

Moreover, maintaining the viscosity and limiting the loss of viscosity of these aqueous compositions should be possible for wide ranges of shear gradients, for example from 0.1 to 1000 s$^{-1}$, from 0.1 to 100 s$^{-1}$, from 1 to 100 s$^{-1}$ or from 0.1 to 1 s$^{-1}$.

There is thus a need to have improved aqueous compositions. The invention enables the preparation of an aqueous composition that provides a solution to all or part of the problems of the aqueous compositions in the prior art.

Thus, the invention provides a heat-stabilizing agent (P) chosen among:
  a polyurethane (P1) prepared by reaction:
    of between 0.1% and 28% by weight of at least one isocyanate compound (A) independently chosen from a diisocyanate compound (A1), a polyisocyanate compound (A2) and combinations thereof;
    of between 2% and 99.5% by weight of at least one polyhydroxy compound (B); and
    of between 0.4% and 70% by weight of at least one compound (C) independently chosen among a monoisocyanate compound (C1) of formula I, a monohydroxylated compound (C2) of formula II, a compound (C3) of formula III and combinations thereof $$T^1\text{-NCO} \qquad (I)$$

wherein $T^1$ independently represents a straight $C_{28}$-$C_{40}$-alkyl group or a branched $C_{28}$-$C_{40}$-alkyl group;

$$T^2\text{-OH} \qquad (II)$$

wherein $T^2$ independently represents a straight $C_{28}$-$C_{40}$-alkyl group or a branched $C_{28}$-$C_{40}$-alkyl group;

$$R^1\text{-}(OE)_a\text{-}(OP)_b\text{-}R^2 \qquad (III)$$

wherein:
  a and b, identical or different, independently represent 0 or an integer or decimal less than 150, a or b being different from 0,
  EO independently represents a $CH_2CH_2O$ group,
  PO independently represents a combination of at least one $CH_2CH_2O$ group with at least one group chosen from $CH(CH_3)CH_2O$ and $CH_2CH(CH_3)O$,
  $R^1$ represents a group comprising at least one labile hydrogen atom and
  $R^2$ independently represents a straight $C_{28}$-$C_{40}$-alkyl group or a branched $C_{28}$-$C_{40}$alkyl group;
  a polyurethane (P2) prepared in the absence of any diisocyanate compound, by reaction:
    of between 0.1% and 28% by weight of at least one polyisocyanate compound (A2);
    of between 2% and 99.5% by weight of at least one polyhydroxylated compound (B); and
    of between 0.4% and 70% by weight of at least one compound (C) independently chosen from a monoisocyanate compound (C1) of formula I, a monohydroxylated compound (C2) of formula II, a compound (C3) of formula III and combinations thereof.

Preferably, the agent (P) is a non-ionic compound, for example an alkoxylated non-ionic compound. Also preferably, the agent (P) is an associative compound, for example an alkoxylated associative compound. Also preferably, the agent (P) is a non-ionic associative compound, for example an alkoxylated non-ionic associative compound.

Preferably according to the invention, the agent (P) is an associative compound. An associative compound makes it possible to produce associative bonds when using the composition according to the invention. These associative bonds generally develop between chemical groups of the same nature, particularly between hydrophobic groups.

The agent (P) can be polyalkoxylated and comprise at least one alkoxylated $C_2$-$C_4$ group—in particular at least one ethoxylated group or one propoxylated group. Preferably, the polyalkoxylated agent (P) comprises ethoxylated groups alone or in combination with propoxylated groups. Also preferably, the agent (P) comprises between 10 and 2,000 alkoxylated $C_2$-$C_4$ groups—in particular between 100 and 1,500 ethoxylated or propoxylated groups. More preferably, the alkoxylated agent (P) comprises between 100 and 1,500 ethoxylated groups. Even more preferably, the alkoxylated agent (P) comprises between 250 and 1,500 ethoxylated groups.

According to the invention, the heat-stabilizing agent (P) is chosen among a polyurethane (P1) and a polyurethane (P2).

For the preparation of the heat-stabilizing agent (P), the diisocyanate compound (A1) comprises two isocyanate groups. Preferably according to the invention, the diisocyanate compound (A1) is independently chosen among:
- the symmetrical aromatic diisocyanate compounds, preferably:
  2,2'-diphenylmethylene diisocyanate (2,2'-MDI) and
  4,4'-diphenylmethylene diisocyanate (4,4'-MDI);
  4,4'-dibenzyl diisocyanate (4,4'-DBDI);
  2,6-toluene diisocyanate(2,6-TDI);
  m-xylylene diisocyanate (m-XDI);
- the symmetrical alicyclic diisocyanate compounds, preferably methylene bis(4-cyclohexylisocyanate) (H12MDI);
- the symmetrical aliphatic diisocyanate compounds, preferably hexamethylene diisocyanate (HDI), pentamethylene diisocyanate (PDI);
- the asymmetric aromatic diisocyanate compounds, preferably:
  2,4'-diphenylmethylene diisocyanate (2,4'-MDI);
  2,4'-dibenzyl diisocyanate (2,4'-DBDI);
  2,4-toluene diisocyanate (2,4-TDI);
- a biuret trimer compound, in particular a biuret trimer compound of a compound chosen among:
  the symmetrical aromatic diisocyanate compounds, preferably:
  2,2'-diphenylmethylene diisocyanate (2,2'-MDI) and
  4,4'-diphenylmethylene diisocyanate (4,4'-MDI);
  4,4'-dibenzyl diisocyanate (4,4'-DBDI);
  2,6-toluene diisocyanate(2,6-TDI);
  m-xylylene diisocyanate (m-XDI);
  the symmetrical alicyclic diisocyanate compounds, preferably methylene bis(4-cyclohexylisocyanate) (H12MDI);
  the symmetrical aliphatic diisocyanate compounds, preferably hexamethylene diisocyanate (HDI), pentamethylene diisocyanate (PDI);
  the asymmetric aromatic diisocyanate compounds, preferably:
  2,4'-diphenylmethylene diisocyanate (2,4'-MDI);
  2,4'-dibenzyl diisocyanate (2,4'-DBDI);
  2,4-toluene diisocyanate (2,4-TDI);
  the asymmetric alicyclic diisocyanate compounds, preferably isophorone diisocyanate (IPDI);
  the asymmetric aromatic diisocyanate compounds, preferably
  2,4'-diphenylmethylene diisocyanate (2,4'-MDI), 2,4'-dibenzyl diisocyanate (2,4'-DBDI),
  2,4-toluene diisocyanate (2,4-TDI);
- the asymmetric alicyclic diisocyanate compounds, preferably isophorone diisocyanate (IPDI).

Preferably according to the invention, the polyisocyanate compound (A2) comprises more than 2 isocyanate groups or more than 2.2 isocyanate groups or more than 2.5 isocyanate groups; preferably, the polyisocyanate compound (A2) comprises more than 2.6 isocyanate groups or more than 2.7 isocyanate groups or more than 3 isocyanate groups; more preferably, the polyisocyanate compound (A2) comprises from 2.2 to 6 isocyanate groups, from 2.2 to 4 isocyanate groups, from 2.2 to 3.5 isocyanate groups, from 2.5 to 6 isocyanate groups, from 2.2 to 5 isocyanate groups, from 2.5 to 4 isocyanate groups, from 2.5 to 3.5 isocyanate groups, in particular from 2.6 to 3.3 isocyanate groups.

Also preferably according to the invention, the polyisocyanate compound (A2) is independently chosen among:
- triphenylmethane-4,4',4"-triisocyanate;
- 1.1',1"-methylidynetris (4-isocyanatobenzene);
- an isocyanurate compound, especially an isocyanurate compound of a compound chosen among:
  the symmetrical aromatic diisocyanate compounds, preferably:
  2,2'-diphenylmethylene diisocyanate (2,2'-MDI) and
  4,4'-diphenylmethylene diisocyanate (4,4'-MDI);
  4,4'-dibenzyl diisocyanate (4,4'-DBDI);
  2,6-toluene diisocyanate(2,6-TDI);
  m-xylylene diisocyanate (m-XDI);
  the symmetrical alicyclic diisocyanate compounds, preferably methylene bis(4-cyclohexylisocyanate) (H12MDI);
  the symmetrical aliphatic diisocyanate compounds, preferably hexamethylene diisocyanate (HDI), pentamethylene diisocyanate (PDI);
  the asymmetric aromatic diisocyanate compounds, preferably:
  2,4'-diphenylmethylene diisocyanate (2,4'-MDI);
  2,4'-dibenzyl diisocyanate (2,4'-DBDI);
  2,4-toluene diisocyanate (2,4-TDI);
- a biuret trimer compound, in particular a biuret trimer compound of a compound chosen among:
  the symmetrical aromatic diisocyanate compounds, preferably:
  2,2'-diphenylmethylene diisocyanate (2,2'-MDI) and
  4,4'-diphenylmethylene diisocyanate (4,4'-MDI);
  4,4'-dibenzyl diisocyanate (4,4'-DBDI);
  2,6-toluene diisocyanate(2,6-TDI);
  m-xylylene diisocyanate (m-XDI);
  the symmetrical alicyclic diisocyanate compounds, preferably methylene bis(4-cyclohexylisocyanate) (H12MDI);
  the symmetrical aliphatic diisocyanate compounds, preferably hexamethylene diisocyanate (HDI), pentamethylene diisocyanate (PDI);
  the asymmetric aromatic diisocyanate compounds, preferably:
  2,4'-diphenylmethylene diisocyanate (2,4'-MDI);
  2,4'-dibenzyl diisocyanate (2,4'-DBDI);
  2,4-toluene diisocyanate (2,4-TDI);
  the asymmetric alicyclic diisocyanate compounds, preferably isophorone diisocyanate (IPDI).

Also preferably according to the invention, the polyhydroxylated compound (B) is chosen among:
a compound (B1) of formula IV:

$$(HO)\text{-}L_n\text{-}(OH) \qquad\qquad (IV)$$

wherein:
L independently represents a poly(alkyleneglycol) residue;
n independently represents a number ranging from 30 to 1,000;
a compound (B1) of formula IV combined with a non-alkoxylated compound (B2) comprising at least three hydroxyl groups;
a polyalkoxylated compound (B3) comprising at least three hydroxyl groups;
a compound (B4) of formula (V):

HO-(OA)$_p$N(Q)-(OA)$_q$-OH          (V)

wherein:
Q independently represents a straight $C_{28}$-$C_{40}$-alkyl group or a branched $C_{28}$-$C_{40}$-alkyl group; preferably a straight $C_{30}$-$C_{36}$-alkyl group or a branched $C_{30}$-$C_{36}$-alkyl group; more preferentially a branched $C_{32}$-alkyl group;
OA independently represents an ethoxylated group or a combination of ethoxylated (—$CH_2CH_2O$—) groups and propoxylated (—$CH_2C(CH_3)O$—) groups;
p and q independently represent a number ranging from 50 to 200;
combinations thereof.
Particularly preferably according to the invention, the polyhydroxylated compound (B) is chosen among:
a compound (B1) of formula IV:

(HO)-L$_n$-(OH)          (IV)

wherein:
L independently represents a poly(ethylene glycol) residue; or
n independently represents a number ranging from 50 to 400, preferably from 100 to 300; or
L independently represents a poly(ethylene glycol) residue and n independently represents a number ranging from 50 to 400, preferably from 100 to 300;
a compound (B2) comprising three hydroxyl groups, preferably chosen among glycerol, pentaerythritol and combinations thereof;
a compound (B3) comprising three hydroxyl groups, preferably a compound (B3) chosen among polyethoxylated glycerol, polyethoxylated pentaerythritol, and combinations thereof;
a compound (B4) of formula V wherein Q independently represents a branched $C_{30}$-$C_{36}$-alkyl group or a straight $C_{30}$-$C_{36}$-alkyl group; preferably a branched $C_{30}$-$C_{36}$-alkyl group; more preferentially a branched $C_{32}$-alkyl group.
More particularly preferably according to the invention, the polyhydroxylated compound (B) is a compound (B1) of formula IV:

(HO)-L$_n$-(OH)          (IV)

wherein L independently represents a poly(ethylene glycol) residue and n independently represents a number ranging from 50 to 400, preferably from 100 to 300.
Also more preferably according to the invention, the compounds (B), (B1), (B3) and (B4) independently have a molar mass (Mw) measured by SEC ranging from 1,500 to 40,000 g/mol, preferably from 2,000 to 20,000 g/mol, more preferentially from 4,000 to 15,000 g/mol or from 5,000 to 12,000 g/mol. According to the invention, the molecular mass is calculated from the hydroxyl index determined in accordance with standard DIN 53240-1, now standard DIN EN ISO 4629-1, by applying the formula: (56,100×functionality in OH groups)/hydroxyl index.

Size Exclusion Chromatography (SEC) is a technique that uses a Waters liquid chromatography instrument equipped with a detector. This detector is a Waters refractive index detector. This liquid chromatography instrument is equipped with a size exclusion column in order to separate the various molecular weights of the copolymers studied. The liquid elution phase is an aqueous phase adjusted to pH 9.00 using 1N sodium hydroxide containing 0.05 M of NaHCO$_3$, 0.1 M of NaNO$_3$, 0.02 M of triethanolamine and 0.03% of NaN$_3$.

According to a first step, the copolymer solution is diluted to 0.9% by dry weight in the dissolution solvent of the SEC, which corresponds to the liquid elution phase of the SEC to which 0.04% of dimethyl formamide, which acts as a flow marker or internal standard, is added. Then, it is filtered using a 0.2 μm filter. Then, 100 μL are injected into the chromatograph (eluent: an aqueous phase adjusted to pH 9.00 by 1N sodium hydroxide containing 0.05 M NaHCO$_3$, 0.1 M NaNO$_3$, 0.02 M triethanolamine and 0.03% NaN$_3$).

The liquid chromatography instrument has an isocratic pump (Waters 515), the flow rate of which is set to 0.8 mL/min. The chromatography instrument also comprises an oven, which itself comprises the following system of columns in series: a Waters Ultrahydrogel Guard precolumn measuring 6 cm in length and 40 mm in inner diameter and a Waters Ultrahydrogel linear column measuring 30 cm in length and 7.8 mm in inner diameter. The detection system is comprised of a Waters 410 RI refractive index detector. The oven is heated to 60° C. and the refractometer is heated to 45° C.

Molecular mass is assessed by detection of the dynamic light scattering using a Viscotek 270 dual detector to determine the molecular mass based on the hydrodynamic volume of the copolymer.

More preferably according to the invention, the polyhydroxylated compound (B) is a compound (B1) of formula IV, wherein L independently represents a poly(ethyleneglycol) residue, n independently represents a number ranging from 30 to 1,000 and a molar mass (Mw) measured by SEC ranging from 2,000 to 20,000 g/mol, preferably from 4,000 to 15,000 g/mol or from 5,000 to 12,000 g/mol.

Much more preferably according to the invention, the polyhydroxylated compound (B) is a compound (B1) of formula IV, wherein L independently represents a poly(alkyleneglycol) residue, preferably a poly(ethyleneglycol) residue, and n independently represents a number ranging from 30 to 1,000, preferably from 40 to 500 or from 80 to 400, more preferentially from 100 to 300.

Also preferably, compound (C) is chosen among:
a monoisocyanate compound (C1) of formula I, wherein T$^1$ independently represents a straight $C_{30}$-$C_{36}$-alkyl group or a branched $C_{30}$-$C_{36}$-alkyl group; preferably a branched $C_{30}$-$C_{36}$-alkyl group; more preferentially a branched $C_{32}$-alkyl group;
a monoisocyanate compound (C1) comprising a single isocyanate group, preferably, a monoisocyanate compound (C1) prepared by a separate reaction:
of at least one compound comprising at least one labile hydrogen atom and
of at least one diisocyanate compound, preferably an asymmetric diisocyanate compound, of at least one polyisocyanate compound, and combinations thereof;
a monohydroxylated compound (C2) of formula II wherein T$^2$ independently represents a straight $C_{30}$-$C_{36}$-alkyl group or a branched $C_{30}$-$C_{36}$-alkyl group;

preferably a branched $C_{30}$-$C_{36}$-alkyl group; more preferentially a branched $C_{32}$-alkyl group;

a compound (C3) of formula II, wherein a represents an integer or decimal ranging from 5 to 100, b represents 0, $R^1$ represents a group comprising at least one labile hydrogen atom and $R^2$ represents a straight $C_{30}$-$C_{36}$-alkyl group or a branched $C_{30}$-$C_{36}$-alkyl group; preferentially a branched $C_{30}$-$C_{36}$-alkyl group; more preferentially a branched $C_{32}$-alkyl group.

According to the invention, the compounds comprising at least one labile hydrogen atom comprise at least one hydrogen atom that reacts with a compound comprising at least one isocyanate group (—N=C=O). Preferably, the compounds comprising at least one labile hydrogen atom are chosen among a compound comprising at least one (—OH) hydroxyl group; a compound comprising a primary (—NH$_2$) amine group or a secondary (—N(H)—) amine group; preferably a compound comprising a hydroxyl group, in particular a mono-alcohol, for example a straight $C_{28}$-$C_{40}$-alkyl mono-alcohol or a branched $C_{28}$-$C_{40}$-alkyl mono-alcohol; preferably a branched $C_{30}$-$C_{36}$-alkyl mono-alcohol; more preferentially a branched $C_{32}$-alkyl mono-alcohol.

Particularly preferably, agent (P) according to the invention is a compound prepared by reaction:
of at least one diisocyanate compound (A1);
of at least one compound (B1) of formula IV, wherein L independently represents a poly(ethyleneglycol) residue, n independently represents a number ranging from 30 to 1,000 and a molar mass (Mw) measured by SEC ranging from 2,000 to 20,000 g/mol, preferably from 4,000 to 15,000 g/mol or from 5,000 to 12,000 g/mol; and
of at least one monohydroxylated compound (C2) of formula II, wherein $T^2$ independently represents a straight $C_{28}$-$C_{40}$-alkyl group or a branched $C_{28}$-$C_{40}$-alkyl group, preferably a straight $C_{30}$-$C_{36}$-alkyl group or a branched $C_{30}$-$C_{36}$-alkyl group; preferentially a branched $C_{30}$-$C_{36}$ alkyl group; more preferentially a branched $C_{32}$alkyl group.

Also preferably, the agent (P) according to the invention is a compound prepared by reaction:
of at least one diisocyanate compound (A1);
of at least one compound (B1) of formula I, wherein L independently represents a poly(ethyleneglycol) residue, n independently represents a number ranging from 30 to 1,000 and a molar mass (Mw) measured by SEC ranging from 2,000 to 20,000 g/mol, preferably from 4,000 to 15,000 g/mol or from 5,000 to 12,000 g/mol; and
of at least one compound (C3) of formula III, wherein a represents an integer or decimal ranging from 5 to 100, b represents 0, $R^1$ represents a hydroxyl group and $R^2$ represents a straight $C_{28}$-$C_{40}$-alkyl group or a branched $C_{28}$-$C_{40}$-alkyl group, preferably a straight $C_{30}$-$C_{36}$-alkyl group or a branched $C_{30}$-$C_{36}$-alkyl group; preferentially a branched $C_{30}$-$C_{36}$-alkyl group; more preferentially a branched $C_{32}$-alkyl group.

The agent (P) can be prepared by preparation methods that are similar to the methods used to prepare urethane compounds in the prior art. When preparing the agent (P) according to the invention, the amounts of reagents used may vary.

According to the invention, the agent (P) is prepared by at least one polymerization reaction:
of between 0.1% and 28% by weight of monomer (A),
of between 2% and 99.5% by weight of monomer (B),
of between 0.4% and 70% by weight of monomer (C), relative to the total amount by weight of monomers.

Preferably according to the invention, the agent (P) is prepared by at least one polymerization reaction:
of between 0.2% and 26% by weight of monomer (A),
of between 6% and 99.3% by weight of monomer (B).
of between 0.5% and 68% by weight of monomer (C), relative to the total amount by weight of monomers.

Also more preferably according to the invention, the agent (P) is prepared by at least one polymerization reaction:
of between 1% and 20% by weight of monomer (A),
of between 25% and 94% by weight of monomer (B),
of between 5% and 55% by weight of monomer (C) relative to the total amount by weight of monomers.

Also more preferably according to the invention, the agent (P) is prepared by at least one polymerization reaction:
of between 1% and 15% by weight of monomer (A),
of between 40% and 94% by weight of monomer (B),
of between 5% and 45% by weight of monomer (C), relative to the total amount by weight of monomers.

According to the invention, the heat-stabilizing agent (P) can be prepared by polymerization reaction of at least one isocyanate compound (A), of at least one polyhydroxylated compound (B) and of at least one compound (C). The heat-stabilizing agent (P) can therefore be prepared by polymerization reaction of the compounds (A), (B) and (C) alone.

Preferably according to the invention, the condensation of compounds (A), (B) and (C) is carried out in the presence of a catalyst. This catalyst can be chosen among acetic acid, an amine, preferably of 1.8-diazabicyclo[5.4.0]undec-7-ene (DBU), a derivative of a metal chosen among Al, Bi, Sn, Hg, Pb, Mn, Zn, Zr, Ti. Traces of water may also participate in the catalysis of the reaction. As examples of metal derivatives, a derivative is preferably chosen among dibutyl bismuth dilaurate, dibutyl bismuth diacetalate, dibutyl bismuth oxide, bismuth carboxylate, dibutyl tin dilaurate, dibutyl tin diacetate, dibutyl tin oxide, a mercury derivative, a lead derivative, zinc salts, manganese salts, a compound comprising chelated zirconium, a compound comprising chelated aluminium. The preferred metal derivative is chosen among a Bi derivative and an Sn derivative.

Advantageously, the uréthane compound according to the invention is a compound that is hydrophilic in nature. The agent (P) can be used directly or in a co-formulated form, preferably in the form of an aqueous formulation, for example an aqueous formulation combining at least one agent (P) and at least one anionic surfactant compound or at least one non-ionic surfactant compound or a compound chosen among cyclodextrin, alkyl-glucosides, osides, solvents.

The invention also provides a method for preparing an aqueous composition that is resistant to temperature changes comprising the addition of at least one heat-stabilizing agent (P) defined according to the invention to the aqueous composition.

According to the invention, the amounts of agent (P) used may vary. The invention also provides such an aqueous composition. Preferably, the aqueous composition prepared according to the invention comprises between 0.05% and 5% by weight, preferably between 0.1% and 2% by weight, of agent (P) relative to the total weight of the composition. According to the invention, the amounts of agent (P) used are thus expressed as dry amounts of agent (P).

Also preferably, the aqueous composition according to the invention is chosen among a hydraulic binder composition, a bonding agent composition, a detergent composition, a cosmetic composition, an ink composition, an aqueous paper coating composition, a coating composition. Preferably according to the invention, the aqueous composition is a varnish composition or a paint composition or a decorative paint composition or an industrial paint composition.

The use of the heat-stabilizing agent (P) of the invention provides the aqueous composition with a heat-resistant function or a resistant function with regard to temperature changes. These functions can be advantageously used when the aqueous composition is subjected to an increase in temperature or when the aqueous composition is subjected to a decrease in temperature.

In addition to being heat-resistant or resisting temperature changes in the aqueous composition according to the invention, the use of the agent (P) according to the invention makes it possible to influence the viscosity of the composition according to the invention. In particular, the agent (P) makes it possible to obtain an aqueous composition with a viscosity that is thermally stable at low shear gradient or at medium shear gradient, potentially at high shear gradient.

According to the invention, the efficacy of the heat-stabilizing agent (P) is assessed by measuring the viscosity and the change in this viscosity. Thus, the agent (P) is used in an aqueous formulation for which the viscosity is assessed after 24 hours by measuring flow curves for various shear gradients (Thermo Scientific Mars III rheometer using a plane-cone geometry of 60 mm in diameter with a 1° angle) and at different temperatures. According to the invention, the initial viscosity is the viscosity measured at a particular shear gradient before changing the temperature within a set temperature range. The change in viscosity can then be assessed by comparing a particular viscosity value with the initial viscosity.

Preferably, the change in viscosity is assessed for temperature changes ranging from 5° C. to 50° C. or ranging from 30° C. to 50° C. or ranging from 15° C. to 35° C. or ranging from 5° C. to 15° C. For these temperature ranges, the initial viscosity is the viscosity measured at 5° C., at 30° C., at 15° C. and at 5° C., respectively.

The efficacy of the heat-stabilizing agent (P) according to the invention can be assessed by comparing it with similar formulations that do not comprise a heat-stabilizing agent (P) but that do have a comparative polymer.

Essentially according to the invention, the heat-stabilizing agent (P) makes it possible to keep the viscosity of the aqueous composition high for wide temperature ranges. The heat-stabilizing agent (P) also makes it possible to keep the viscosity of the aqueous composition high for numerous shear gradients, preferably for wide temperature ranges.

Thus, preferably according to the invention, the aqueous composition has a viscosity measured for a shear gradient ranging from 0.1 to 1,000 $s^{-1}$ and for a temperature change ranging from 5° C. to 50° C., comprised between 30% and 98%, preferably between 44% and 98%, of the initial viscosity value of the aqueous composition.

Also according to the invention, the aqueous composition has a viscosity measured for a shear gradient ranging from 0.1 to 1,000 $s^{-1}$ and for a temperature change ranging from 30° C. to 50° C., comprised between 50% and 98%, preferably between 65% and 98%, of the initial viscosity value of the aqueous composition.

Also according to the invention, the aqueous composition has a viscosity measured for a shear gradient ranging from 0.1 to 1,000 $s^{-1}$ and for a temperature change ranging from 15° C. to 35° C., comprised between 50% and 98%, preferably between 68% and 98%, of the initial viscosity value of the aqueous composition.

Also according to the invention, the aqueous composition has a viscosity measured for a shear gradient ranging from 0.1 to 1,000 $s^{-1}$ and for a temperature change ranging from 5° C. to 15° C., comprised between 70% and 98%, preferably between 81% and 98%, of the initial viscosity value of the aqueous composition.

Also preferably according to the invention, the aqueous composition has a viscosity measured for a shear gradient ranging from 0.1 to 100 $s^{-1}$ and for a temperature change ranging from 5° C. to 50° C., comprised between 30% and 98%, preferably between 44% and 98%, of the initial viscosity value of the aqueous composition.

Also according to the invention, the aqueous composition has a viscosity measured for a shear gradient ranging from 0.1 to 100 $s^{-1}$ and for a temperature change ranging from 30° C. to 50° C., comprised between 50% and 98%, preferably between 68% and 98%, of the initial viscosity value of the aqueous composition.

Also according to the invention, the aqueous composition has a viscosity measured for a shear gradient ranging from 0.1 to 100 $s^{-1}$ and for a temperature change ranging from 15 to 35° C., comprised between 50% and 98%, preferably between 66% and 98%, of the initial viscosity value of the aqueous composition.

Also according to the invention, the aqueous composition has a viscosity measured for a shear gradient ranging from 0.1 to 100 $s^{-1}$ and for a temperature change ranging from 5° C. to 15° C., comprised between 70% and 98%, preferably between 81% and 98%, of the initial viscosity value of the aqueous composition.

Also preferably according to the invention, the aqueous composition has a viscosity measured for a shear gradient ranging from 1 to 100 $s^{-1}$ and for a temperature change ranging from 5° C. to 50° C., comprised between 30% and 98%, preferably between 44% and 98%, of the initial viscosity value of the aqueous composition.

Also according to the invention, the aqueous composition has a viscosity measured for a shear gradient ranging from 1 to 100 $s^{-1}$ and for a temperature change ranging from 30° C. to 50° C., comprised between 50% and 98%, preferably between 67% and 98%, of the initial viscosity value of the aqueous composition.

Also according to the invention, the aqueous composition has a viscosity measured for a shear gradient ranging from 1 to 100 $s^{-1}$ and for a temperature change ranging from 15° C. to 35° C., comprised between 70% and 98%, preferably between 84% and 98%, of the initial viscosity value of the aqueous composition.

Also according to the invention, the aqueous composition has a viscosity measured for a shear gradient ranging from 1 to 100 $s^{-1}$ and for a temperature variation ranging from 5° C. to 15° C., comprised between 70% and 98%, preferably between 81% and 98%, of the initial viscosity value of the aqueous composition.

Also preferably according to the invention, the aqueous composition has a viscosity measured for a shear gradient ranging from 0.1 to 1 $s^{-1}$ and for a temperature change ranging from 5° C. to 50° C., comprised between 40% and 98%, preferably between 56% and 98%, of the initial viscosity value of the aqueous composition.

Also according to the invention, the aqueous composition has a viscosity measured for a shear gradient ranging from 0.1 to 1 $s^{-1}$ and for a temperature change ranging from 30° C. to 50° C., comprised between 40% and 98%, preferably between 67% and 98%, of the initial viscosity value of the aqueous composition.

Also according to the invention, the aqueous composition has a viscosity measured for a shear gradient ranging from 0.1 to 1 $s^{-1}$ and for a temperature change ranging from 15° C. to 35° C., comprised between 70% and 98%, preferably between 84% and 98%, of the initial viscosity value of the aqueous composition.

Also according to the invention, the aqueous composition has a viscosity measured for a shear gradient ranging from 0.1 to 1 $s^{-1}$ and for a temperature change ranging from 5° C. to 15° C., comprised between 80% and 98%, preferably between 95% and 98%, of the initial viscosity value of the aqueous composition.

In addition to maintaining viscosity, the heat-stabilizing agent (P) also advantageously enables the viscosity of the aqueous composition to be thermally stabilized for many shear gradient values and for wide temperature ranges relative to the initial viscosity of the aqueous composition. Thus, the agent (P) makes it possible to limit the loss of viscosity of the aqueous composition subject to a temperature change. The agent (P) used according to the invention makes it possible to limit the viscosity loss for various shear gradients applied to the aqueous composition, and therefore for different conditions for which this composition is used.

The invention thus also relates to a method for thermally stabilizing the viscosity of an aqueous composition that is particularly advantageous when there are temperature changes during preparation or during transport or during storage, and even more so during the application or use of the aqueous composition according to the invention. Preferably, the thermal stabilization method according to the invention makes it possible to limit or avoid the reduction in the viscosity of the aqueous composition according to the invention when there are temperature changes during the application or use of the aqueous composition according to the invention. Preferably, the thermal stabilization method according to the invention makes it possible to limit or avoid the reduction in the viscosity of the aqueous composition according to the invention for temperature changes ranging from 5° C. to 50° C. or ranging from 30° C. to 50° C. or ranging from 15° C. to 35° C. or ranging from 5° C. to 15° C.

Thus, the invention provides a method for thermally stabilizing the viscosity of an aqueous composition comprising the addition of at least one agent (P) according to the invention to the aqueous composition.

Particularly advantageously, the thermal stabilization method according to the invention makes it possible to limit or avoid the reduction of the viscosity of the aqueous composition according to the invention during temperature changes.

Preferably, the method for thermally stabilizing the viscosity of an aqueous composition comprises the addition of at least one heat-stabilizing agent (P) to the aqueous composition for which the decrease in viscosity measured for a shear gradient ranging from 0.1 to 1,000 $s^{-1}$ is less than 70%, preferably less than 56%, for a temperature range of between 5° C. and 50° C., relative to the initial viscosity of the aqueous composition.

Also according to the invention, the method for thermally stabilizing the viscosity of an aqueous composition comprises the addition of at least one heat-stabilizing agent (P) to the aqueous composition for which the decrease in viscosity measured for a shear gradient ranging from 0.1 to 1,000 $s^{-1}$ is less than 50%, preferably less than 35%, for a temperature range of from 30° C. to 50° C., relative to the initial viscosity of the aqueous composition.

Also according to the invention, the method for thermally stabilizing the viscosity of an aqueous composition comprises the addition of at least one heat-stabilizing agent (P) to the aqueous composition for which the decrease in viscosity measured for a shear gradient ranging from 0.1 to 1,000 $s^{-1}$ is less than 50%, preferably less than 32%, for a temperature range of from 15° C. to 35° C., relative to the initial viscosity of the aqueous composition.

Also according to the invention, the method for thermally stabilizing the viscosity of an aqueous composition comprises the addition of at least one heat-stabilizing agent (P) to the aqueous composition for which the decrease in viscosity measured for a shear gradient ranging from 0.1 to 1,000 $s^{-1}$ is less than 30%, preferably less than 19%, for a temperature range of from 5° C. to 15° C., relative to the initial viscosity of the aqueous composition.

Also preferably, the method for thermally stabilizing the viscosity of an aqueous composition comprises the addition of at least one heat-stabilizing agent (P) to the aqueous composition for which the decrease in viscosity measured for a shear gradient of from 0.1 to 100 $s^{-1}$ is less than 70%, preferably less than 56%, for a temperature range of between 5° C. and 50° C., relative to the initial viscosity of the aqueous composition.

Also according to the invention, the method for thermally stabilizing the viscosity of an aqueous composition comprises the addition of at least one heat-stabilizing agent (P) to the aqueous composition for which the decrease in viscosity measured for a shear gradient ranging from 0.1 to 100 $s^{-1}$ is less than 50%, preferably less than 32%, for a temperature range of between 30° C. and 50° C., relative to the initial viscosity of the aqueous composition.

Also according to the invention, the method for thermally stabilizing the viscosity of an aqueous composition comprises the addition of at least one heat-stabilizing agent (P) to the aqueous composition for which the decrease in viscosity measured for a shear gradient ranging from 0.1 to 100 $s^{-1}$ is less than 50%, preferably less than 34%, for a temperature range of between 15° C. and 35° C., relative to the initial viscosity of the aqueous composition.

Also according to the invention, the method for thermally stabilizing the viscosity of an aqueous composition comprises the addition of at least one heat-stabilizing agent (P) to the aqueous composition for which the decrease in viscosity measured for a shear gradient ranging from 0.1 to 100 $s^{-1}$ is less than 30%, preferably less than 19%, for a temperature range of between 5° C. and 15° C., relative to the initial viscosity of the aqueous composition.

Also preferably, the method for thermally stabilizing the viscosity of an aqueous composition comprises the addition of at least one heat-stabilizing agent (P) to the aqueous composition for which the decrease in viscosity measured for a shear gradient ranging from 1 to 100 $s^{-1}$ is less than 70%, preferably less than 56%, for a temperature range of between 5° C. and 50° C., relative to the initial viscosity of the aqueous composition.

Also according to the invention, the method for thermally stabilizing the viscosity of an aqueous composition comprises the addition of at least one heat-stabilizing agent (P) to the aqueous composition for which the decrease in viscosity measured for a shear gradient ranging from 1 to 100 $s^{-1}$ is less than 50%, preferably less than 33%, for a temperature range of between 30° C. and 50° C., relative to the initial viscosity of the aqueous composition.

Also according to the invention, the method for thermally stabilizing the viscosity of an aqueous composition comprises the addition of at least one heat-stabilizing agent (P)

in the aqueous composition for which the decrease in viscosity measured for a shear gradient ranging from 1 to 100 s$^{-1}$ is less than 30%, preferably less than 16%, for a temperature range of between 15° C. and 35° C., relative to the initial viscosity of the aqueous composition.

Also according to the invention, the method for thermally stabilizing the viscosity of an aqueous composition comprises the addition of at least one heat-stabilizing agent (P) to the aqueous composition for which the decrease in viscosity measured for a shear gradient ranging from 1 to 100 s$^{-1}$ is less than 30%, preferably less than 19%, for a temperature range of between 5° C. and 15° C., relative to the initial viscosity of the aqueous composition.

Also preferably, the method for thermally stabilizing the viscosity of an aqueous composition comprises the addition of at least one heat-stabilizing agent (P) to the aqueous composition for which the decrease in viscosity measured for a shear gradient ranging from 0.1 to 1 s$^{-1}$ is less than 60%, preferably less than 44%, for a temperature range of between 5° C. and 50° C., relative to the initial viscosity of the aqueous composition.

Also according to the invention, the method for thermally stabilizing the viscosity of an aqueous composition comprises the addition of at least one heat-stabilizing agent (P) to the aqueous composition for which the decrease in viscosity measured for a shear gradient ranging from 0.1 to 1 s$^{-1}$ is less than 50%, preferably less than 33%, for a temperature range of between 30° C. and 50° C., relative to the initial viscosity of the aqueous composition.

Also according to the invention, the method for thermally stabilizing the viscosity of an aqueous composition comprises the addition of at least one heat-stabilizing agent (P) in the aqueous composition for which the decrease in viscosity measured for a shear gradient ranging from 0.1 to 1 s$^{-1}$ is less than 30%, preferably less than 16%, for a temperature range of between 15° C. and 35° C., relative to the initial viscosity of the aqueous composition.

Also according to the invention, the method for thermally stabilizing the viscosity of an aqueous composition comprises the addition of at least one heat-stabilizing agent (P) in the aqueous composition for which the decrease in viscosity measured for a shear gradient ranging from 0.1 to 1 s$^{-1}$ is less than 20%, preferably less than 5%, for a temperature range of between 5° C. and 15° C., relative to the initial viscosity of the aqueous composition.

Preferably for the thermal stabilization method according to the invention, between 0.05 and 5% by weight, preferably between 0.1 and 2% by weight, of agent (P) is added to the aqueous composition, relative to the total weight of the composition.

The invention also provides a method for improving the resistance to temperature changes of an aqueous composition comprising the addition of at least one heat-stabilizing agent (P) defined according to the invention to the aqueous composition.

Particularly advantageously, the method for improving the resistance to temperature changes according to the invention makes it possible to limit or avoid the reduction of the viscosity of the aqueous composition, preferably when there are temperature changes during preparation or during transport or during storage, or during the application or use of the aqueous composition according to the invention.

Preferably according to the invention, the method for improving the resistance to temperature changes of an aqueous composition is used at a temperature ranging from 5° C. to 50° C. or ranging from 30° C. to 50° C. or ranging from 15° C. to 35° C. or ranging from 5° C. to 15° C.

Preferably for the method for improving the resistance to temperature changes according to the invention, between 0.05 and 5% by weight, preferably between 0.1 to 2% by weight, of agent (P) is added to the aqueous composition, relative to the total weight of the composition.

The aqueous composition according to the invention can be used in several technical fields. Preferably, the aqueous composition according to the invention is used in the field of materials in particular in the form of a hydraulic binder composition or a bonding agent composition, in the field of detergents in particular in the form of a detergent composition, in the field of cosmetics in particular in the form of a cosmetic composition, in the printing field in particular in the form of an ink composition, in the field of papermaking in particular in the form of an aqueous paper coating composition, in the field of coatings—for example in the fields of varnishes or paints—in particular in the form of a coating composition, in particular a varnish composition or a paint composition or a decorative paint composition or an industrial paint composition.

The invention therefore provides a formulation F comprising at least one aqueous composition according to the invention combined with at least one functional substance that is useful in the field for which the formulation is used.

Preferably, the formulation according to the invention is a coating composition, in particular a varnish composition or a paint composition. The formulation according to the invention therefore combines at least one aqueous composition according to the invention and at least one substance chosen among an organic or mineral pigment, organic particles, organo-metallic particles, mineral particles, for example calcium carbonate, talc, kaolin, mica, silicates, silica, metal oxides, in particular titanium dioxide, iron oxides. The formulation according to the invention may also comprise at least one agent chosen among a particle-spacer agent, a dispersing agent, a stabilizing steric agent, an electrostatic stabilizer, an opacifying agent, a solvent, a coalescent agent, an anti-foaming agent, a preservative agent, a biocide, a spreading agent, a thickening agent, a film-forming copolymer and mixtures thereof.

Moreover, the formulation according to the invention can be a concentrated, water-based pigment stock comprising at least one aqueous composition according to the invention and at least one colored organic or mineral pigment.

The following examples illustrate the various aspects of the invention.

EXAMPLE 1

Preparation of Urethane Compounds (P1a) and (P1b) According to the Invention and of a Comparative Urethane Compound (CP1)

In a 3 L glass reactor (container 1) equipped with a mechanical stirring rod, vacuum pump, and nitrogen inlet, and heated by means of a jacket for which oil circulates, 357 g of compound (B) (polyethylene glycol with a molecular mass ($M_w$) of 8,000 g/mol or PEG 8,000) is introduced and heated to 90° C. in an inert atmosphere. This is followed by the addition of 139.8 g of dotriacontane alcohol (monoalcohol comprising a branched $C_{32}$-alkyl group) that is ethoxylated with 25 equivalents of ethylene oxide as a compound (C3) of formula III for which a represents 25, EO represents a $CH_2CH_2O$ group, $R^1$ represents OH and $R^2$ represents a branched $C_{32}$-alkyl group. This mixture is subjected to inert atmosphere/vacuum cycles until the water content reaches or is less than 1,500 ppm.

29.7 g of isophorone diisocyanate (IPDI) as compound (A1) and containing 0.3 g of a bismuth carboxylate catalyst are then rapidly added. When the addition is complete, the reaction mixture is left to stir for 60 minutes at 90° C.±1° C. Then, the absence of isocyanate is checked by back titration. 1 g is collected from the reaction medium to which an excess of dibutylamine (1 mol, for example) is added, which reacts with any isocyanate groups that may be present in the medium. Any unreacted dibutylamine is then assayed with hydrochloric acid (1 N, for example). The number of isocyanate groups present in the reaction medium can then be deduced. If this number is not zero, the reaction is continued for 15-minute periods until the reaction is completed. The heat stabilizing agent (P1a) according to the invention is obtained.

Similarly, a heat-stabilizing agent (P1b) according to the invention is prepared using 382.1 g of PEG 8,000 as compound (B), 55.7 g of non-ethoxylated dotriacontane alcohol (monoalcohol comprising a branched $C_{32}$-alkyl group) as compound (C2) of formula II wherein $T^2$ represents a branched $C_{32}$-alkyl group and 26.5 g of IPDI as compound (A1). The heat-stabilizing agent (P1b) according to the invention is obtained.

Similarly, a comparative urethane compound (CP1) is prepared using 437.8 g of PEG 8,000, 165 g of tristyrylphenol alcohol (monoalcohol comprising a tristyrylphenolyl group) which is ethoxylated with 25 equivalents of ethylene oxide and 36.8 g of IPDI as compound (A1). The comparative urethane compound (CP1a) is obtained.

EXAMPLE 2

Preparation and Evaluation of Aqueous Formulations Comprising a Heat-Stabilizing Agent According to the Invention or a Comparative Urethane Compound In a 500 mL beaker, 400 mL of bi-permuted water is poured and heated to 60° C. Under mechanical stirring, 8.16 g of heat-stabilizing agent (P1a) is added. This addition is done slowly in order to allow a gradual homogenisation of the mixture. A gelled formulation F1 according to the invention is obtained.

Similarly, a gelled formulation F2 according to the invention is prepared by replacing the heat-stabilizing agent (P1) with 21.05 g of heat-stabilizing agent (P1b). Also similarly, a gelled formulation CF1 according to the invention is prepared by replacing the heat-stabilizing agent (P1a) with 44.04 g of comparative compound (CP1).

The amount of water in formulations F2 and CF1 is adjusted so that these formulations have starting viscosities comparable to that of formulation F1 for a shear gradient of $10 \ s^{-1}$. The thickening efficacy of the formulations is assessed after 24 hours by measuring flow curves for various shear gradients (Thermo Scientific Mars III rheometer using a plane-cone geometry of 60 mm in diameter with a 1° angle) and at different temperatures. The thermal stability of the formulation is then assessed by calculating the change in viscosity depending on the temperature change for the various shear gradients applied. The change in viscosity is calculated in a standardized manner relative to the viscosity measured at 4.9° C. For each viscosity value measured, the ratio R (viscosity measured at a certain temperature/viscosity measured at 4.9° C.) corresponding to the residual viscosity of each formulation assessed, is calculated.

The results of the viscosity values and R ratios for the formulation F1 comprising the agent (P1) according to the invention are shown in Table 1.

TABLE 1

| Formulation F1 comprising the agent (P1a) | | | | |
|---|---|---|---|---|
| Temperature | Shear Gradient ($s^{-1}$) | | | |
| (° C.) | 0.1 | 1 | 10 | 100 |
| | Viscosity (mPa · s) | | | |
| 4.9 | 192.00 | 29.33 | 7.35 | 0.77 |
| 10.0 | 188.50 | 29.43 | 7.18 | 0.67 |
| 14.9 | 182.40 | 28.23 | 6.96 | 0.63 |
| 20.0 | 171.70 | 27.83 | 6.58 | 0.58 |
| 24.9 | 163.30 | 26.83 | 6.32 | 0.54 |
| 29.9 | 154.10 | 25.64 | 6.05 | 0.51 |
| 35.0 | 139.80 | 23.61 | 5.61 | 0.47 |
| 39.9 | 130.50 | 21.98 | 5.28 | 0.44 |
| 45.1 | 117.60 | 19.24 | 4.73 | 0.39 |
| 50.0 | 106.90 | 17.23 | 4.30 | 0.35 |
| | R | | | |
| 4.9 | 1.00 | 1.00 | 1.00 | 1.00 |
| 10.0 | 0.98 | 1.00 | 0.98 | 0.86 |
| 14.9 | 0.95 | 0.96 | 0.95 | 0.81 |
| 20.0 | 0.89 | 0.95 | 0.90 | 0.74 |
| 24.9 | 0.85 | 0.91 | 0.86 | 0.70 |
| 29.9 | 0.80 | 0.87 | 0.82 | 0.66 |
| 35.0 | 0.73 | 0.80 | 0.76 | 0.60 |
| 39.9 | 0.68 | 0.75 | 0.72 | 0.57 |
| 45.1 | 0.61 | 0.66 | 0.64 | 0.50 |
| 50.0 | 0.56 | 0.59 | 0.59 | 0.46 |

The results for formulation F2 comprising the agent (P1b) according to the invention are shown in Table 2.

TABLE 2

| Formulation F2 comprising the agent (P1b) | | | | |
|---|---|---|---|---|
| Temperature | Shear Gradient ($s^{-1}$) | | | |
| (° C.) | 0.1 | 1 | 10 | 100 |
| | Viscosity (mPa · s) | | | |
| 4.9 | 292.30 | 37.93 | 9.41 | 1.03 |
| 10.0 | 289.60 | 36.30 | 8.71 | 0.98 |
| 14.9 | 285.70 | 34.70 | 7.87 | 0.89 |
| 20.0 | 281.20 | 33.27 | 7.10 | 0.79 |
| 24.9 | 277.70 | 31.82 | 6.42 | 0.73 |
| 29.9 | 274.40 | 30.53 | 5.96 | 0.67 |
| 35.0 | 266.10 | 28.69 | 5.34 | 0.60 |
| 39.9 | 254.30 | 27.57 | 4.95 | 0.55 |
| 45.1 | 223.00 | 25.84 | 4.36 | 0.49 |
| 50.0 | 197.30 | 24.62 | 3.94 | 0.45 |
| | R | | | |
| 4.9 | 1.00 | 1.00 | 1.00 | 1.00 |
| 10.0 | 0.99 | 0.96 | 0.93 | 0.95 |
| 14.9 | 0.98 | 0.91 | 0.84 | 0.87 |
| 20.0 | 0.96 | 0.88 | 0.75 | 0.76 |
| 24.9 | 0.95 | 0.84 | 0.68 | 0.70 |
| 29.9 | 0.94 | 0.80 | 0.63 | 0.65 |
| 35.0 | 0.91 | 0.76 | 0.57 | 0.58 |
| 39.9 | 0.87 | 0.73 | 0.53 | 0.53 |
| 45.1 | 0.76 | 0.68 | 0.46 | 0.48 |
| 50.0 | 0.67 | 0.65 | 0.42 | 0.44 |

The results for the comparative formulation CF1 comprising the comparative polymer (CP1) are shown in Table 3.

TABLE 3

Formulation CF1 comprising the polymer (CP1)

| Temperature | Shear Gradient (s$^{-1}$) | | | |
|---|---|---|---|---|
| (° C.) | 0.1 | 1 | 10 | 100 |
| | Viscosity (mPa · s) | | | |
| 4.9 | 9.20 | 8.61 | 8.85 | 8.41 |
| 10.0 | 8.56 | 8.16 | 8.02 | 7.46 |
| 14.9 | 7.67 | 7.41 | 7.36 | 6.69 |
| 20.0 | 6.30 | 6.16 | 6.22 | 5.49 |
| 24.9 | 5.39 | 5.36 | 5.50 | 4.76 |
| 29.9 | 4.64 | 4.64 | 4.84 | 4.11 |
| 35.0 | 3.67 | 3.68 | 3.88 | 3.25 |
| 39.9 | 3.15 | 3.14 | 3.34 | 2.77 |
| 45.1 | 2.50 | 2.46 | 2.63 | 2.18 |
| 50.0 | 2.15 | 2.10 | 2.26 | 1.86 |
| | R | | | |
| 4.9 | 1.00 | 1.00 | 1.00 | 1.00 |
| 10.0 | 0.93 | 0.95 | 0.91 | 0.89 |
| 14.9 | 0.83 | 0.86 | 0.79 | 0.79 |
| 20.0 | 0.68 | 0.72 | 0.70 | 0.65 |
| 24.9 | 0.59 | 0.62 | 0.62 | 0.57 |
| 29.9 | 0.50 | 0.54 | 0.55 | 0.49 |
| 35.0 | 0.40 | 0.43 | 0.44 | 0.39 |
| 39.9 | 0.34 | 0.36 | 0.38 | 0.33 |
| 45.1 | 0.27 | 0.29 | 0.30 | 0.26 |
| 50.0 | 0.23 | 0.24 | 0.25 | 0.22 |

For different shear gradients, the change in viscosity of the formulations comprising an agent according to the invention or a comparative polymer is compared for various temperature ranges by calculating the viscosity loss.

The viscosity loss results are shown in Table 4.

TABLE 4

| Formulation | Temperature range (° C.) | Viscosity loss (%) per shear gradient (s$^{-1}$) | | | |
|---|---|---|---|---|---|
| | | 0.1 | 1 | 10 | 100 |
| with (P1a) | 5->15 | 5% | 4% | 5% | 19% |
| | 15->35 | 23% | 16% | 19% | 25% |
| | 30->50 | 31% | 33% | 29% | 31% |
| | 5->50 | 44% | 41% | 41% | 54% |
| with (P1b) | 5->15 | 2% | 9% | 16% | 13% |
| | 15->35 | 7% | 17% | 32% | 34% |
| | 30->50 | 28% | 19% | 34% | 32% |
| | 5->50 | 33% | 35% | 58% | 56% |
| with (CP1) | 5->15 | 17% | 14% | 21% | 21% |
| | 15->35 | 52% | 50% | 47% | 51% |
| | 30->50 | 54% | 55% | 53% | 55% |
| | 5->50 | 77% | 76% | 75% | 78% |

For many temperature ranges, it is possible to observe that the heat-stabilizing agents according to the invention make it possible to limit the viscosity loss much more significantly than the comparative polymer. This thermal stabilization of the viscosity is possible for shear gradients corresponding to many conditions of use or application of aqueous compositions.

The invention claimed is:

1. A heat-stabilizing agent (P), comprising:
a polyurethane (P1) comprising, in polymerized form:
a diisocyanate compound (A1), a polyisocyanate compound (A2), or combination thereof in a range of from 0.1 to 28 wt. %;
a polyhydroxylated compound (B) in a range of from 2 to 99.5 wt. %; and
a monoisocyanate compound (C1) of formula I, a monohydroxylated compound (C2) of formula II, a compound (C3) of formula III, or a combination thereof, in a range of from 0.4 to 70 wt. %, $$T^1\text{-NCO (I)}, T^2\text{-OH (II)}, R^1\text{-(OE)}_a\text{-(OP)}_b\text{-R}^2 \quad (III)$$

wherein $T^1$ and $T^2$ are independently a straight $C_{30}$-$C_{36}$-alkyl group or a branched $C_{30}$-$C_{36}$-alkyl group,
a and b are independently 0 or an integer or decimal less than 150, a or b being different from 0,
EO is independently a $CH_2CH_2O$ group,
PO is independently a combination of (i) at least one $CH_2CH_2O$ group with (ii) at least one group chosen $CH(CH_3)CH_2O$ and/or $CH_2CH(CH_3)O$,
$R^1$ is a group comprising at least one labile hydrogen atom, and
$R^2$ is independently a straight $C_{30}$-$C_{36}$-alkyl group or a branched $C_{30}$-$C_{36}$-alkyl group,
or
a polyurethane (P2) prepared in the absence of any diisocyanate compound, comprising, in reacted form:
a polyisocyanate compound (A2) in a range of from 0.1 to 28 wt. %;
a polyhydroxylated compound (B) in a range of from 2 to 99.5 wt. %; and
a monoisocyanate compound (C1) of formula I, a monohydroxylated compound (C2) of formula II, a compound (C3) of formula III, or a combination thereof, in a range of from 0.4 to 70 wt. %; and
wherein the agent (P), when added to an aqueous solution at from 0.1 to 2 wt. %, relative to total composition weight, creates an aqueous composition, the aqueous composition having, for a temperature variation in a range of from 5 to 50° C., a decrease in viscosity measured for a shear gradient in a range from 0.1 to 100 s$^{-1}$, of less than 70% relative to an initial viscosity value of the aqueous composition.

2. The agent (P) of claim 1, wherein the polyisocyanate compound (A2) is present and comprises more than 2 isocyanate groups.

3. The agent (P) of claim 1, wherein the polyhydroxylated compound (B) is:
a compound (B1) of formula IV:

$$\text{(HO)-L}_n\text{-(OH)} \quad (IV)$$

L being independently a poly (alkyleneglycol) residue, and n being independently a number in a range of from 30 to 1,000;
a compound (B1) of formula (IV) combined with a non-alkoxylated compound (B2) comprising at least three hydroxyl groups;
a polyalkoxylated compound (B3) comprising at least three hydroxyl groups;
a compound (B4) of formula (V):

$$\text{HO-(OA)}_p\text{-N(Q)-(OA)}_q\text{-OH} \quad (V),$$

Q independently being a straight $C_{28}$-$C_{40}$-alkyl group or a branched $C_{28}$-$C_{40}$-alkyl group, OA independently being an ethoxylated group or a combination of ethoxylated (—$CH_2CH_2O$—) groups and propoxylated (—$CH_2C(CH_3)O$—) groups, and p and q independently being a number in a range of from 50 to 200;
or a combination thereof.

4. The agent (P) of claim 1, for which the compound (B) is:
a compound (B1) of formula (IV):

$$\text{(HO)-L}_n\text{-(OH)} \quad (IV)$$

L independently being a poly(ethylene glycol) residue, and n independently being a number in a range of from 50 to 400;
a compound (B2) comprising three hydroxyl groups;
a polyethoxylated compound (B3) comprising three hydroxyl groups;
a compound (B4) of formula (V) wherein Q is independently a branched $C_{30}$-$C_{36}$-alkyl group or a straight $C_{30}$-$C_{36}$-alkyl group.

5. The agent (P) of claim 1, wherein the compounds (B) has a molar mass (Mw) measured by SEC in a range of from 1,500 to 40,000 g/mol.

6. The agent (P) of claim 1, wherein the monoisocyanate compound (C1) is a compound of formula (I) wherein $T^1$ is independently a straight $C_{30}$-$C_{36}$-akyl group or a branched $C_{30}$-$C_{36}$-alkyl group, or
wherein the monoisocyanate compound (C1) is prepared by a separate reaction of (i) at least one compound comprising at least one labile hydrogen atom and of (ii) at least one diisocyanate compound, or
wherein the monohydroxylated compound (C2) is a compound of formula (II) wherein $T^2$ is represents a straight $C_{30}$-$C_{36}$-alkyl group or a branched $C_{30}$-$C_{36}$-alkyl group, or
wherein the compound (C3) is a compound of formula (III) wherein a is an integer or decimal ranging from 5 to 100, b is 0, $R^1$ is a group comprising at least one labile hydrogen atom and $R^2$ is a straight $C_{30}$-$C_{36}$-alkyl group or a branched $C_{30}$-$C_{36}$-alkyl group.

7. The agent (P) of claim 1, prepared by at least one polymerization reaction of:
the monomer (A) in a range of from 0.2 to 26 wt. %.
the monomer (B) in a range of from 6 to 99.3 wt. %, and
the monomer (C) in a range of from 0.5 to 68 wt. %,
relative to total monomer weight.

8. A method for preparing an aqueous composition that is heat-resistant to temperature changes, the method comprising:
adding the heat-stabilizing agent (P) of claim 1, to the aqueous composition.

9. The method of claim 8 wherein the aqueous composition comprises the heat-stabilizing agent (P) in a range of from 0.05 to 5 wt. %, relative to total composition weight.

10. The method of claim 8, wherein the aqueous composition has, for a temperature variation in a range of from 5 to 50° C., a viscosity measured for a shear gradient in a range from:
1 to 1,000 $s^{-1}$, in a range of from 30 to 98% of an initial viscosity value of the aqueous composition, or
1 to 100 $s^{-1}$, in a range of from 30 to 98% of the initial viscosity value of the aqueous composition, or
1 to 100 $s^{-1}$, in a range of from 30 to 98% of the initial viscosity value of the aqueous composition, or
0.1 to 1 $s^{-1}$, in a range of from 40 to 98% of the initial viscosity value of the aqueous composition.

11. An aqueous composition, made by the method of claim 8.

12. The composition of claim 11, which is a hydraulic binder composition, a bonding agent composition, a detergent composition, a cosmetic composition, an ink composition, an aqueous paper coating composition, or a coating composition.

13. A method for heat stabilizing a viscosity of an aqueous composition, the method comprising:
adding the heat-stabilizing agent (P) of claim 1 to the aqueous composition, wherein, for a temperature ranging from 5° C. to 50° C., a decrease in viscosity measured for a shear gradient ranging from:
0.1 to 1,000 $s^{-1}$ is less than 70% relative to an initial viscosity of the aqueous composition, or
0.1 to 100 $s^{-1}$ is less than 70% relative to the initial viscosity of the aqueous composition, or
1 to 100 $s^{-1}$ is less than 70% relative to the initial viscosity of the aqueous composition, or
0.1 to 1 $s^{-1}$ is less than 60% relative to the initial viscosity of the aqueous composition.

14. The method of claim 13, wherein the heat-stabilizing agent (P) is added to the aqueous composition in an amount in a range of from 0.05 to 5 wt. %, relative to total composition weight.

15. A method for improving resistance to temperature changes of an aqueous composition, the method comprising:
adding the heat-stabilizing agent (P) of claim 1 to the aqueous composition.

16. The heat-stabilizing agent (P) of claim 1, comprising:
a polyurethane (P1) comprising, in polymerized form:
isophorone diisocyanate (IPDI) in a range of from 0.1 to 28 wt. %;
polyethylene glycol with a molecular mass (Mw) of 8,000 g/mol at from 2 to 99.5 wt. %; and
a C32-alkyl ethoxylated alcohol with 25 equivalents of ethylene oxide in a range of from 0.4 to 70 wt. %.

17. A heat-stabilizing agent (P), comprising:
a polyurethane (P1) comprising, in polymerized form:
isophorone diisocyanate (IPDI) at from 0.1 to 28 wt. %;
polyethylene glycol with a molecular mass (Mw) of 8,000 g/mol at from 2 to 99.5 wt. %; and
a C32-alkyl ethoxylated alcohol with 25 equivalents of ethylene oxide at from 0.4 to 70 wt. %,
wherein the agent (P), when added to an aqueous solution at from 0.1 to 2 wt. %, relative to total composition weight, creates an aqueous composition, the aqueous composition having, for a temperature variation of from 5 to 50° C., a decrease in viscosity measured for a shear gradient at from 0.1 to 100 $s^{-1}$, is less than 70% relative to an initial viscosity value of the aqueous composition.

* * * * *